US012665626B2

(12) United States Patent
Sheng et al.

(10) Patent No.: US 12,665,626 B2
(45) Date of Patent: Jun. 23, 2026

(54) RADIO FREQUENCY CIRCUIT AND ELECTRONIC DEVICE

(71) Applicant: VIVO MOBILE COMMUNICATION CO., LTD., Chang'an Dongguan (CN)

(72) Inventors: Hongwei Sheng, Chang'an Dongguan (CN); Xuefeng Sheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 503 days.

(21) Appl. No.: 18/344,646

(22) Filed: Jun. 29, 2023

(65) Prior Publication Data

US 2023/0344461 A1 Oct. 26, 2023

Related U.S. Application Data

(63) Continuation of application No. PCT/CN2021/141160, filed on Dec. 24, 2021.

(30) Foreign Application Priority Data

Dec. 31, 2020 (CN) .......................... 202011628264.3

(51) Int. Cl.
*H04B 1/401* (2015.01)
(52) U.S. Cl.
CPC .................................... *H04B 1/401* (2013.01)
(58) Field of Classification Search
CPC ....... H04B 1/0064; H04B 1/401; Y02D 30/70
See application file for complete search history.

(56) References Cited

U.S. PATENT DOCUMENTS 11,265,028 B2 * 3/2022 Uejima .................... H03H 9/70
11,290,135 B2 * 3/2022 Tsuda ................... H04B 1/0078
(Continued)

FOREIGN PATENT DOCUMENTS

CN          104852749 A     8/2015
CN          105933911 A     9/2016
(Continued)

OTHER PUBLICATIONS

Youming Zhang, "Research and Design on the Wideband RF Transceiver Oriented IMT-2020," Southeast University, (Dec. 2018).
(Continued)

*Primary Examiner* — Nguyen T Vo
(74) *Attorney, Agent, or Firm* — Price Heneveld LLP

(57) ABSTRACT

This application provides a radio frequency circuit and an electronic device. The radio frequency circuit includes: a first amplifier, a first switch, a first frequency band transceiver unit, a second frequency band transceiver unit, and an antenna, where the first switch includes a first movable end, a first non-movable end, and a second non-movable end, where an input end of the first amplifier is connected to a radio frequency transceiver, an output end of the first amplifier is connected to the first movable end, the first non-movable end is connected to one end of the first frequency band transceiver unit, the second non-movable end is connected to one end of the second frequency band transceiver unit, and the other end the first frequency band transceiver unit and the other end of the second frequency band transceiver unit are both connected to the antenna.

9 Claims, 3 Drawing Sheets

(56) References Cited

U.S. PATENT DOCUMENTS

| | | | | |
|---|---|---|---|---|
| 11,757,482 | B2 * | 9/2023 | Nagamori | ............... H03F 3/193 |
| | | | | 455/339 |
| 2014/0187284 | A1 * | 7/2014 | Sanchez | ............... H04B 1/0057 |
| | | | | 455/550.1 |
| 2017/0094607 | A1 | 3/2017 | Ripley | |
| 2017/0264337 | A1 | 9/2017 | Kogure et al. | |
| 2021/0152202 | A1 | 5/2021 | Uejima | |

FOREIGN PATENT DOCUMENTS

| | | | | | |
|---|---|---|---|---|---|
| CN | 108540147 | A | 9/2018 | | |
| CN | 108964675 | A | 12/2018 | | |
| CN | 109861734 | A | 6/2019 | | |
| CN | 111327344 | A | 6/2020 | | |
| CN | 111726138 | A | 9/2020 | | |
| CN | 111756399 | A | 10/2020 | | |
| CN | 112769447 | A | 5/2021 | | |
| CN | 213661597 | U | 7/2021 | | |
| EP | 3547792 | A1 * | 10/2019 | ............. | H04B 1/401 |
| WO | 2016104011 | A1 | 6/2016 | | |
| WO | 2019240096 | A1 | 12/2019 | | |

OTHER PUBLICATIONS

CN Office Action dated Nov. 22, 2021 as received in Application No. 202011628264.3.
International Search Report and Written Opinion of the International Searching Authority dated Mar. 16, 2022 as received in Application No. PCT/CN2021/141160.

* cited by examiner

RADIO FREQUENCY CIRCUIT AND ELECTRONIC DEVICE

CROSS-REFERENCE TO RELATED APPLICATIONS

This application is a continuation application of PCT International Application No. PCT/CN2021/141160 filed on Dec. 24, 2021, which claims priority to Chinese Patent Application No. 202011628264.3 filed on Dec. 31, 2020, which is incorporated herein by reference in its entirety.

TECHNICAL FIELD

This application relates to the field of communication technologies, and in particular, to a radio frequency circuit and an electronic device.

BACKGROUND

An electronic device (for example, a mobile phone, a tablet computer (portable android device, Pad), or an in-vehicle communication system) can access a non-standalone (NSA) network for communication only after achieving Long Term Evolution (LTE) and New Radio (NR) dual connection with a base station. This requires the electronic device to have LTE and NR radio frequency front-end circuits that can work simultaneously. For example, a mobile communication operator requires that an electronic device supporting NSA needs to support a dual connectivity (EN-DC) combination with Band 3+second frequency band and Band 39+second frequency band E-UTRA as a master cell group (MCG), and NR as a secondary cell (SCG), where E-UTRA represents evolved universal terrestrial radio access (that is, Evolved Universal Terrestrial Radio Access).

Currently, to achieve an EN-DC combination with a second frequency band (such as Band 3+N41 frequency band or Band 39+N41 frequency band), a radio frequency solution of the electronic device requires two independent power amplifiers (PA) combined with another device to achieve simultaneous working of 4G and 5G networks, that is, requires one LTE PA circuit and one PA of second frequency band (for example, an N41 frequency band). Therefore, a radio frequency circuit has a complex form, and a relatively large quantity of discrete devices are required, resulting in high circuit costs.

SUMMARY

According to a first aspect, an embodiment of this application provides a radio frequency circuit, including: a first amplifier, a first switch, a first frequency band transceiver unit, a second frequency band transceiver unit, and an antenna, where the first switch includes a first movable end, a first non-movable end, and a second non-movable end;

an input end of the first amplifier is connected to a radio frequency transceiver, an output end of the first amplifier is connected to the first movable end, the first non-movable end is connected to one end of the first frequency band transceiver unit, the second non-movable end is connected to one end of the second frequency band transceiver unit, and the other end the first frequency band transceiver unit and the other end of the second frequency band transceiver unit are both connected to the antenna.

According to a second aspect, an embodiment of this application further provides an electronic device, including the radio frequency circuit provided in the embodiments of this application.

DETAILED DESCRIPTION

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

In this specification and the claims of this application, the terms "first", "second", and so on are intended to distinguish similar objects but do not necessarily indicate a specific order or sequence. It should be understood that the data termed in such a way is interchangeable in proper circumstances, so that the embodiments of this application can be implemented in other sequences than the sequence illustrated or described herein. In addition, "and/or" in this specification and the claims indicate at least one of the connected objects, and the character "/" usually indicates an "or" relationship between the associated objects.

A radio frequency circuit provided in the embodiments of this application is described in detail below through specific embodiments with reference to the accompanying drawings.

Figures 1, 2:
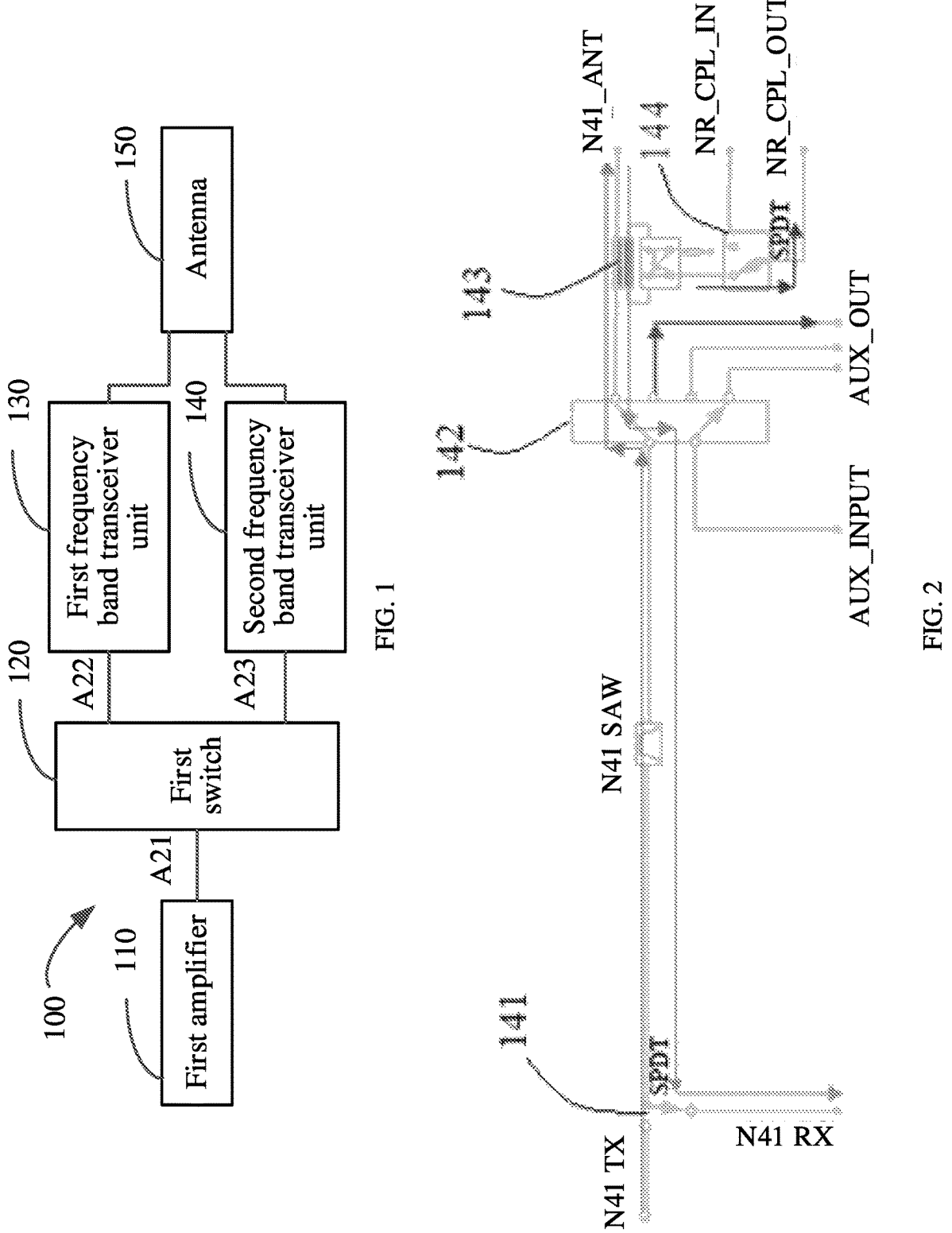
FIG. 1 is a first schematic structural diagram of a radio frequency circuit according to an embodiment of this application.
FIG. 2 is a schematic structural diagram of a second frequency band transceiver unit in a radio frequency circuit according to an embodiment of this application.

As shown in FIG. 1, an embodiment of this application provides a radio frequency circuit 100, including: a first amplifier 110, a first switch 120, a first frequency band transceiver unit 130, a second frequency band transceiver unit 140 and an antenna 150, where the first switch 120 includes a first movable end A21, a first non-movable end A22, and a second non-movable end A23.

An input end of the first amplifier 110 is connected to a radio frequency transceiver, an output end of the first amplifier 110 is connected to the first movable end A21, the first non-movable end A22 is connected to one end of the first frequency band transceiver unit 130, the second non-movable end A23 is connected to one end of the second frequency band transceiver unit 140, and the other end of the first frequency band transceiver unit 130 and the other end of the second frequency band transceiver unit 140 are both connected to the antenna 150.

In a case that the first movable end A21 of the first switch 120 is connected to the first non-movable end A22, the output end of the first amplifier 110 communicates with one end of the first frequency band transceiver unit 130 through the first switch 120. In this way, the output end of the first amplifier 110 communicates with a first sub-antenna through the first switch 120 and the first frequency band transceiver unit 130. The first amplifier 110 receives a signal of a first frequency band from the radio frequency transceiver, amplifies the signal of the first frequency band, and then transmits the amplified signal to one end of the first frequency band transceiver unit 130 through the first switch 120. The first frequency band transceiver unit 130 processes (for example, including filtering processing) the amplified signal of the first frequency band and then transmits the processed signal to the antenna 150. In a case that the first movable end A21 of the first switch 120 is connected to the second non-movable end A23, the output end of the first amplifier 110 communicates with one end of the second frequency band transceiver unit 140 through the first switch 120. That is, the output end of the first amplifier 110 communicates with a second sub-antenna through the first switch 120 and the second frequency band transceiver unit 140. The first amplifier 110 receives a signal of a second frequency band from the radio frequency transceiver, amplifies the signal of the second frequency band, and then transmits the amplified signal to one end of the second frequency band transceiver unit 140 through the first switch 120. The second frequency band transceiver unit 140 processes (for example, including filtering processing) the amplified signal of the second frequency band, and then transmits the processed signal to the antenna 150. In an example, the first frequency band is a frequency band in an LTE frequency band, and the second frequency band is a frequency band in a 5G frequency band, for example, a frequency band in an NR frequency band.

In the radio frequency circuit of the embodiments of this application, the output end of the first amplifier 110 is connected to the first movable end A21 of the first switch 120, the first non-movable end A22 of the first switch 120 is connected to one end of the first frequency band transceiver unit 130, the second non-movable end A23 of the first switch 120 is connected to one end of the second frequency band transceiver unit 140, and the output end of the first amplifier 110 may communicate with one end of the first frequency band transceiver unit 130 or one end of the second frequency band transceiver unit 140 through the first switch 120, that is, the first frequency band transceiver unit 130 and the second frequency band transceiver unit 140 can share the first amplifier 110, without the need to respectively provide an amplifier for the first frequency band transceiver unit 130 and the second frequency band transceiver unit 140. Therefore, a quantity of devices in the radio frequency circuit can be reduced, so that overall device costs of the radio frequency circuit can be reduced. Meanwhile, the radio frequency circuit needs to be laid out in a printed circuit board (PCB). Therefore, an occupied area of the PCB can be reduced due to the reduced quantity of devices in the radio frequency circuit, so that layout difficulty of the PCB can be reduced. In addition, a requirement for amplifiers can be reduced, and complexity of the radio frequency circuit is reduced. In this way, a path loss can be reduced, so that sensitivity of the radio frequency circuit can be improved and radio frequency power consumption can be reduced.

In an embodiment, the antenna 150 includes a first sub-antenna and a second sub-antenna, the other end of the first frequency band transceiver unit 130 is connected to the first sub-antenna, and the other end of the second frequency band transceiver unit 140 is connected to the second sub-antenna.

In a case that the output end of the first amplifier 110 communicates with the first sub-antenna through the first switch 120 and the first frequency band transceiver unit 130, the first amplifier 110 is configured to amplify a signal of a first frequency band, and the first frequency band transceiver unit 130 processes the amplified signal of the first frequency band and then transmits the processed signal to the first sub-antenna.

In a case that the output end of the first amplifier 110 communicates with the second sub-antenna through the first switch 120 and the second frequency band transceiver unit 140, the first amplifier 110 is configured to amplify a signal of a second frequency band, and the second frequency band transceiver unit 140 processes the amplified signal of the second frequency band and then transmits the processed signal to the second sub-antenna.

If the first movable end A21 of the first switch 120 is connected to the first non-movable end A22, the output end of the first amplifier 110 communicates with the first sub-antenna through the first switch 120 and the first frequency band transceiver unit 130. In this case, the first amplifier 110 may amplify a signal of a first frequency band. The first frequency band transceiver unit 130 processes the amplified signal of the first frequency band and then transmits the processed signal to the first sub-antenna. The signal obtained by processing the amplified signal of the first frequency band is transmitted through the first sub-antenna. If the first movable end A21 of the first switch 120 is connected to the second non-movable end A23, the output end of the first amplifier 110 communicates with the first sub-antenna through the first switch 120 and the second frequency band transceiver unit 140. In this case, the first amplifier 110 may amplify a signal of a second frequency band. The second frequency band transceiver unit 140 processes the amplified signal of the second frequency band and then transmits the processed signal to the second sub-antenna. The signal obtained by processing the amplified signal of the second frequency band is transmitted through the second sub-antenna. That is, signals of different frequency bands are transmitted through different sub-antennas, so that interference can be reduced, thereby improving signal transmission performance.

As shown in FIG. 2, in an embodiment, the second frequency band transceiver unit 140 includes: a second switch 141, a second frequency band receive port, a second frequency band filter, a third switch 142, and a first coupler 143.

The second switch 141 includes a third non-movable end, a fourth non-movable end, and a second movable end. The third switch 142 includes a fifth non-movable end and a third movable end. One end of the second frequency band transceiver unit 140 is the third non-movable end of the second switch 141. The fourth non-movable end is connected to the second frequency band receive port. The second movable end is connected to the third movable end through the second frequency band filter. The fifth non-movable end is connected to a first end of the first coupler 143. A second end of the first coupler 143 is connected to the antenna 150. The other end of the second frequency band transceiver unit 140 is the second end of the first coupler 143.

It should be noted that, the second end of the first coupler 143 may be connected to the second sub-antenna of the antenna 150. In a case that the second movable end is connected to the third non-movable end, the second non-movable end of the first switch 120 communicates with the second frequency band filter through the second switch 141. The first amplifier 110 amplifies a signal of a second frequency band and then transmits the amplified signal to the second frequency band filter through the first switch 120 and the second switch 141. The amplified signal of the second frequency band is filtered by the second frequency band filter and then transmitted to the third switch 142. In a case that the third movable end of the third switch 142 is connected to the fifth non-movable end, the signal obtained by filtering the amplified signal of the second frequency band by the second frequency band filter may be transmitted to the first end of the first coupler 143 through the third switch 142, coupled by the first coupler 143, and then transmitted to the antenna 150 through the second end. In a case that the second movable end is connected to the fourth non-movable end, the second frequency band receive port communicates with the second frequency band filter through the second switch 141. In a case that the third movable end of the third switch 142 is connected to the fifth non-movable end, a first signal is received through the antenna 150, transmitted to the second end of the first coupler 143, coupled by the first coupler 143, and then transmitted to the third switch 142 through the first end. The coupled signal is transmitted to the second frequency band filter through the third switch 142 for filtering, and then transmitted to the second frequency band receive port, achieving signal reception, and the like.

In an example, if the second frequency band transceiver unit is an N41 frequency band transceiver unit, as shown in FIG. 2, the second frequency band receive port is an N41 frequency band receive port, that is, an N41 RX port in FIG. 2, the second end of the first coupler 143 is an N41_ANT end in FIG. 2, and the second frequency band filter is an N41 frequency band filter that allows an N41 frequency band, that is, an N41 SAW filter in FIG. 2, where SAW is Surface Acoustic Wave, that is, a surface acoustic wave filter.

As shown in FIG. 2, in an embodiment, the third switch 142 further includes a fourth movable end, a sixth non-movable end, a seventh non-movable end, and an eighth non-movable end. The fourth movable end is used for connecting to an input port of a target frequency band, for example, an AUX_INPUT port in FIG. 2. The target frequency band is one of frequency bands in a New Radio (NR) frequency band other than the second frequency band. The sixth non-movable end is connected to a first power output port. The seventh non-movable end is connected to a second power output port. The eighth non-movable end is connected to a third power output port.

It should be noted that, in a case that the fourth movable end is connected to the sixth non-movable end, the input port of the target frequency band communicates with the first power output port. In a case that the fourth movable end is connected to the seventh non-movable end, the input port of the target frequency band communicates with the second power output port. In a case that the fourth movable end is connected to the eighth non-movable end, the input port of the target frequency band communicates with the third power output port. That is, through connection of the fourth movable end to the sixth non-movable end, the seventh non-movable end, or the eighth non-movable end, a signal of the target frequency band that is inputted through the input port of the target frequency band may be transmitted to the first power output port, the second power output port, or the third power output port, and outputted through the first power output port, the second power output port, or the third power output port.

As shown in FIG. 2, the second switch may be an SPDT (single pole, double throw) switch, the second frequency band filter may be a SAW, and the third switch may be a DP4T (double pole, four throw) switch.

Specific pins are described as follows:

N41 TX: the second non-movable end connected to the first switch 120 connected to the first amplifier.

N41 RX: a receive path device, such as an LNA (low noise amplifier), connected to the outside of a PA.

SPDT: a radio frequency single pole double throw switch, enabling a common end of the switch to switch between two paths.

DP4T switch: a double pole four throw switch. Three AUX_OUTs in FIG. 2 may be used as a channel sounding reference signal (SRS) power output port of an N41 1T4R. AUX_INPUT may be used as an input of another NR frequency band.

First coupler: serves as part of a power detection loop, couples transmit power of the fifth non-movable end of the third switch, and outputs the transmit power to an FBRX (power detection) port of a transceiver (TC).

NR_CPL_IN: Herein, the SPDT switches a path to connect NR_CPL_IN and NR_CPL_OUT, and an external power detection signal of an NR frequency band is inputted through the NR_CPL_IN, passes through the SPDT path, and then is outputted through the NR_CPL_OUT. When a quantity of FBRX ports of the TC is limited, power detection signals of different frequency bands can be outputted through a common path.

NR_CPL_OUT: an output port of the power detection signal, which, after the SPDT switches the path, may be connected to a coupler of an N41_ANT path or may be connected to an NR_CPL_IN port.

Specific signal path:

N41 transmit path: An N41 TX signal passes through an amplifier circuit inside the PA, then passes through the SPDT (SPDT switching, connecting the N41 TX end and the SAW end), and then is outputted through an N41 ANT port after passing through the N41 SAW, the DP4T switch (the right side switching to the uppermost end), and the first coupler.

N41 receive path: An N41 RX signal is received by the antenna, passes through a front-end path, enters the radio frequency circuit through N41_ANT port, and passes through the N41 SAW and the SPDT (SPDT switching, connecting the SAW end and the N41 RX end).

N41 SRS path: The N41 TX signal passes through the amplifier circuit inside the PA, then passes through the SPDT (SPDT switching, connecting the N41 TX end and the SAW end), then passes through the N41 SAW and the DP4T switch (the right side switching to the lower three ports), and is outputted through the AUX_OUT, so that this path is connected to other N41 receive paths to implement an SRS function.

N41 power coupling: When the N41 TX signal passes through the first coupler after the DP4T switch, the first coupler couples to a particular power (the magnitude of the coupling power is determined according to a coupling factor), and then the signal passes through the SPDT switch (SPDT switching, connecting the coupler and the NR_CPL_OUT).

Figure 3:
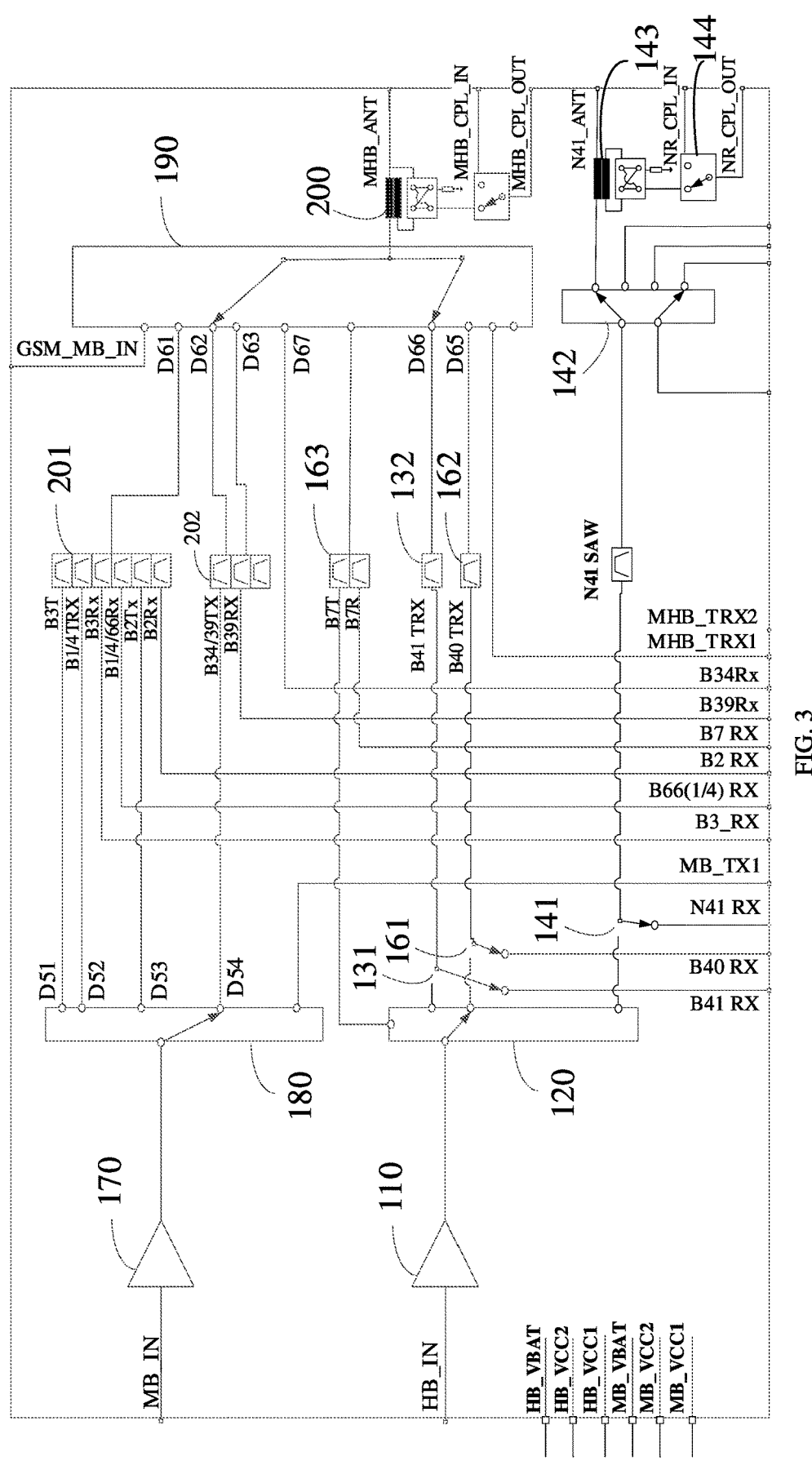
FIG. 3 is a second schematic structural diagram of a radio frequency circuit according to an embodiment of this application.
Figure 4:
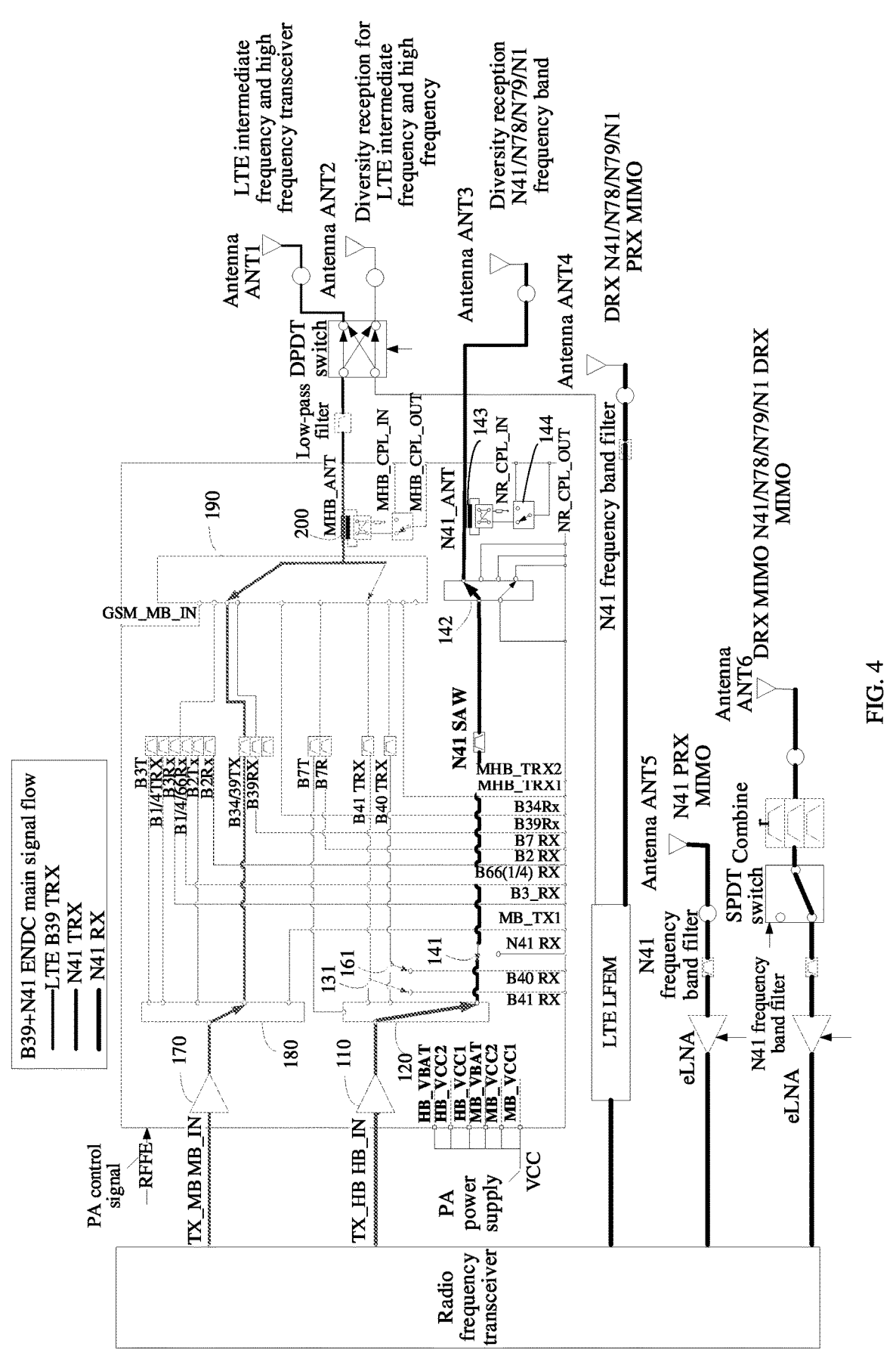
FIG. 4 is a principle diagram of implementing network communication by using a radio frequency circuit according to an embodiment of this application.

As shown in FIG. 3, in an embodiment, the second frequency band transceiver unit 140 further includes a fourth switch 144. The fourth switch 144 includes a fifth movable end, a ninth non-movable end, and a tenth non-movable end. The ninth non-movable end is connected to a third end of the first coupler 143. The tenth non-movable end is used for connecting to a power detection signal input port. The fifth movable end is used for connecting to a power detection signal output port.

If the signal obtained by filtering the amplified signal of the second frequency band by the second frequency band filter is transmitted to the first end of the first coupler 143 through the third switch 142, a first coupling signal obtained through coupling by the first coupler 143 is transmitted to the antenna 150 through the second end, and a second coupling signal obtained through coupling by the first coupler 143 may be transmitted to the ninth non-movable end through the third end. If the fifth movable end is connected to the ninth non-movable end, the third end communicates with the power detection signal output port, and the second coupling signal may be outputted through the power detection signal output port. If the fifth movable end is connected to the tenth non-movable end, the power detection signal input port communicates with the power detection signal output port.

As shown in FIG. 3, in an embodiment, the first frequency band transceiver unit 130 includes a fifth switch 131, a first frequency band receive port, and a first frequency band filter 132. The fifth switch 131 includes a sixth movable end, an eleventh non-movable end, and a twelfth non-movable end.

One end of the first frequency band transceiver unit 130 is the eleventh non-movable end of the fifth switch 131. The twelfth non-movable end is connected to the first frequency band receive port. The sixth movable end is connected to one end of the first frequency band filter. The other end of the first frequency band filter is used for connecting to the antenna 150. The other end of the first frequency band transceiver unit 130 is the other end of the first frequency band filter 132.

It should be noted that, the other end of the first frequency band filter may be connected to the first sub-antenna of the antenna 150. In a case that the sixth movable end is connected to the eleventh non-movable end, if the first non-movable end of the first switch 120 is connected to the first movable end, the first non-movable end of the first switch 120 communicates with the first frequency band filter through the fifth switch 131. The first amplifier 110 amplifies a signal of a first frequency band, and then transmits the amplified signal to the first frequency band filter through the first switch 120 and the fifth switch 131. The amplified signal of the first frequency band is filtered by the first frequency band filter, and then may be transmitted to the antenna 150. In a case that the sixth movable end is connected to the twelfth non-movable end, the first frequency band receive port communicates with the first frequency band filter through the fifth switch 131, and receives a signal through the antenna 150. The signal is transmitted to the first frequency band filter for filtering, and then transmitted to the first frequency band receive port, achieving signal reception, and the like. For example, if the first frequency band transceiver unit is a B41 frequency band transceiver unit, as shown in FIG. 3, the first frequency band receive port may be a B41 RX port in FIG. 3. It should be noted that, in the accompanying drawings provided in this application, TRX represents transceiver, RX represents receive, TX represents transmit, DRX represents diversity receive, PRX represents primary receive, MIMO represents multiple input multiple output (Multi Input Multi Output).

In an embodiment, the radio frequency circuit further includes a third frequency band transceiver unit. The first switch 120 further includes a thirteenth non-movable end. The thirteenth non-movable end is connected to one end of the third frequency band transceiver unit. The other end of the third frequency band transceiver unit is used for connecting to the antenna 150.

That is, the first frequency band transceiver unit 130, the second frequency band transceiver unit 140, and the third frequency band transceiver unit can share the first amplifier 110, thereby reducing a quantity of amplifiers and reducing costs of the radio frequency circuit. In an example, as shown in FIG. 3, the third frequency band transceiver unit may include a B40 frequency band transceiver unit, that is, a third frequency band is a B40 frequency band. The third frequency band transceiver unit may include a control switch 161, a third frequency band filter 162, and a third frequency band receive port. The control switch 161 includes a control movable end, a first control non-movable end, and a second control non-movable end. One end of the third frequency band transceiver unit is the first control non-movable end. The first control non-movable end is connected to the thirteenth non-movable end. The second control non-movable end is connected to the third frequency band receive port. The control movable end is connected to one end of the third frequency band filter. The other end of the third frequency band transceiver unit is the other end of the third frequency band filter.

As shown in FIG. 3, in an embodiment, the radio frequency circuit may further include a B7 frequency band transceiver unit. The B7 frequency band transceiver unit includes a B7 frequency band filter 163. The B7 frequency band filter includes a first port, a second port, and a third port. The first switch 120 further includes a fourteenth non-movable end. The fourteenth non-movable end is connected to the first port. The second port is connected to a B7 frequency band receive port. The third port is used for connecting to the antenna 150. That is, the B7 frequency band transceiver unit, the first frequency band transceiver unit 130, the second frequency band transceiver unit 140, and the third frequency band transceiver unit can share the first amplifier 110.

As shown in FIG. 3, in an embodiment, the radio frequency circuit further includes a second amplifier 170, a sixth switch 180, a fourth frequency band transceiver unit, a seventh switch 190, and a second coupler 200. The sixth switch 180 includes a seventh movable end and a plurality of fourteenth non-movable ends. The seventh switch 190 includes a plurality of fifteenth non-movable ends and an eighth movable end and a ninth movable end connected to each other. The fourth frequency band transceiver unit includes a first duplexer module 201. One side of the first duplexer module 201 includes a plurality of first transmission ports and a plurality of second transmission ports. The other side of the first duplexer module 201 includes a third transmission port.

An input end of the second amplifier 170 is connected to the radio frequency transceiver. An output end of the second amplifier 170 is connected to the seventh movable end. Each of the first transmission ports is connected to one fourteenth non-movable end and the plurality of first transmission ports are connected to different fourteenth non-movable ends. Each of the second transmission ports is connected to a receive port of a corresponding frequency band. The third transmission port is connected to one fifteenth non-movable end. The other end of the first frequency band transceiver unit is connected to one fifteenth non-movable end. The other end of the second frequency band transceiver unit is connected to one fifteenth non-movable end. The fifteenth non-movable end connected to the other end of the second frequency band transceiver unit and the fifteenth non-movable end connected to the other end of the first frequency band transceiver unit are different from each other and are both different from the fifteenth non-movable end connected to the third transmission port. The eighth movable end and the ninth movable end are each used for connecting to a seventh end of the second coupler. An eighth end of the second coupler 200 is connected to the antenna. For example, the eighth end of the second coupler 200 may be an MHB_ANT end shown in FIG. 3.

It may be understood that, the fourth frequency band transceiver unit includes a plurality of frequency band transceiver subunits, each frequency band transceiver subunit includes a duplexer of a corresponding frequency band, and the duplexers of the plurality of frequency band transceiver subunits form a first duplexer module. The plurality of first transmission ports include transmit ends of a plurality of frequency bands corresponding to the plurality of frequency band transceiver units. The plurality of second transmission ports includes receive ends of a plurality of frequency bands corresponding to the plurality of frequency band transceiver units.

In an example, the radio frequency circuit further includes a fifth frequency band transceiver unit. The fifth frequency band transceiver unit includes a second duplexer 202. One side of the second duplexer includes a first transmitter of a fifth frequency band and a first receiver of the fifth frequency band. The other side of the second duplexer includes a second transmitter of the fifth frequency band and a second receiver of the fifth frequency band. The first transmitter is connected to one fourth non-movable end, which is different from the fourteenth non-movable ends connected to the plurality of first transmission ports. The first receiver is connected to a fifth frequency band receive port. The second transmitter and the second receiver are each connected to one fifteenth non-movable end, and the fifteenth non-movable ends connected thereto are different from each other.

For example, the plurality of frequency band transceiver units include a B3 frequency band transceiver unit, a B1/B4 frequency band transceiver unit, and a B2 frequency band transceiver unit. Four fourteenth non-movable ends in the fifth switch 131 are D51, D52, D53, and D54, respectively. Each of the first transmission ports is connected to one different fourteenth non-movable end, that is, a first transmission port of the B3 frequency band transceiver unit is connected to D51, a first transmission port of the B1/B4 frequency band transceiver unit is connected to D52, and a first transmission port of the B2 frequency band transceiver unit is connected to D53. A second transmission port of the B3 frequency band transceiver unit is connected to a B3 frequency band receive port. A second transmission port of the B1/B4 frequency band transceiver unit is connected to a B1/B4 frequency band receive port. A second transmission port of the B2 frequency band transceiver unit is connected to a B2 frequency band receive port. The plurality of fifteenth non-movable ends include D61, D62, D63, D64, D65, D66, and D67. The third transmission port is connected to one fifteenth non-movable end, that is, connected to D61. For example, the fifth frequency band transceiver unit may include a B39 frequency band transceiver unit. The first transmitter is connected to D54. The first receiver is connected to a B39 frequency band receive port. The second transmitter is connected to one fifteenth non-movable end, that is, connected to D62. The second receiver is connected to one fifteenth non-movable end, that is, connected to D63. The third port of the B7 frequency band transceiver unit is connected to D64, that is, the third port of the B7 frequency band transceiver unit is connected to the antenna 150 through the sixth switch and the second coupler 200. The other end of a filter in the B40 frequency band transceiver unit is connected to D65, that is, the other end of the filter in the B40 frequency band transceiver unit is connected to the antenna 150 through the sixth switch and the second coupler 200. The other end of the first frequency band filter in the first frequency band transceiver unit 130 is connected to D66, that is, the other end of the first frequency band filter is connected to D66 through the sixth switch and the second coupler 200. A fifth end of the B34 frequency band transceiver unit is further connected to one fifteenth non-movable end of the sixth switch, that is, D67.

In an example, the first amplifier 110 may be a high frequency amplifier, and the second amplifier may be an intermediate frequency amplifier. The filters in the embodiments of this application may all be band-pass filters. For example, the first frequency band filter is a filter through which the signal of the first frequency band can pass and signals of other frequency bands are filtered out, and the second frequency band filter is a filter through which the signal of the second frequency band can pass and signals of other frequency bands are filtered out.

As shown in FIG. 3, in an embodiment, frequency band ranges of the first frequency band and the second frequency band at least partially overlap. For example, the first frequency band transceiver unit 130 may include a B41 frequency band transceiver unit, and the second frequency band transceiver unit 140 may include an N41 frequency band transceiver unit. In addition, the second frequency band transceiver unit 140 may alternatively include an N1 frequency band transceiver unit, an N3 frequency band transceiver unit, and an N28 frequency band transceiver unit. In this case, the second frequency band transceiver unit 140 may correspondingly include a first target frequency band transceiver unit with a frequency band range at least partially overlaps an N1 frequency band, a second target frequency band transceiver unit with a frequency band range at least partially overlaps an N3 frequency band, and a third target frequency band transceiver unit with a frequency band range at least partially overlaps an N28 frequency band, respectively.

As shown in FIG. 3, using an EN-DC combination of B39+N41 as an example, an LTE B39 TRX line is shown in FIG. 3, and an LTE B39 signal passes through the second amplifier 170, the sixth switch 180, a B39 filter 202, the seventh switch 190, and the second coupler 200 and is then outputted from an MHB_ANT port.

An N41 TRX line is shown in FIG. 3, and an N41 signal is outputted through the N41_ANT port after passing through the first amplifier 110, the first switch 120, the N41 SAW filter, a DP4T radio frequency switch, and the first coupler, reaching an ANT3 antenna.

Other RX paths of N41 are shown in FIG. 3.

In the radio frequency circuit of the embodiments of this application, there is no separate N41 PA, and a power supply VCC and an RFFE control signal required by a separate PA are not needed. With fewer devices, such as no combiner on the N41 TRX path, costs can be reduced.

An embodiment of this application further provides an electronic device, including: the radio frequency circuit 100 provided in the embodiments of this application.

It should be noted that, the term "include", "comprise", or any other variation thereof in this specification is intended to cover a non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements.

The technical features of the embodiments described above may be randomly combined. For brevity of description, not all possible combinations of the technical features in the foregoing embodiments are described; however, the combinations of these technical features should be considered as falling within the scope defined by this specification as long as no contradiction occurs.

The embodiments of this application have been described above with reference to the accompanying drawings, but this application is not limited to the foregoing specific implementations. The foregoing specific implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. A radio frequency circuit, comprising: a first amplifier, a first switch, a first frequency band transceiver unit, a second frequency band transceiver unit, and an antenna, wherein the first switch comprises a first movable end, a first non-movable end, and a second non-movable end, wherein an input end of the first amplifier is connected to a radio frequency transceiver, an output end of the first amplifier is connected to the first movable end, the first non-movable end is connected to one end of the first frequency band transceiver unit, the second non-movable end is connected to one end of the second frequency band transceiver unit, and the other end the first frequency band transceiver unit and the other end of the second frequency band transceiver unit are both connected to the antenna;

wherein the second frequency band transceiver unit comprises: a second switch, a second frequency band receive port, a second frequency band filter, a third switch, and a first coupler, wherein the second switch comprises a third non-movable end, a fourth non-movable end, and a second movable end, the third switch comprises a fifth non-movable end and a third movable end, one end of the second frequency band transceiver unit is the third non-movable end of the second switch, the fourth non-movable end is connected to the second frequency band receive port, the second movable end is connected to the third movable end through the second frequency band filter, the fifth non-movable end is connected to a first end of the first coupler, a second end of the first coupler is connected to the antenna, and the other end of the second frequency band transceiver unit is the second end of the first coupler.

2. The radio frequency circuit according to claim 1, wherein the antenna comprises a first sub-antenna and a second sub-antenna, the other end of the first frequency band transceiver unit is connected to the first sub-antenna, and the other end of the second frequency band transceiver unit is connected to the second sub-antenna;

in a case that the output end of the first amplifier communicates with the first sub-antenna through the first switch and the first frequency band transceiver unit, the first amplifier is configured to amplify a signal of a first frequency band, and the first frequency band transceiver unit processes the amplified signal of the first frequency band and then transmits the processed signal to the first sub-antenna; and in a case that the output end of the first amplifier communicates with the second sub-antenna through the first switch and the second frequency band transceiver unit, the first amplifier is configured to amplify a signal of a second frequency band, and the second frequency band transceiver unit processes the amplified signal of the second frequency band and then transmits the processed signal to the second sub-antenna.

3. The radio frequency circuit according to claim 1, wherein the third switch further comprises a fourth movable end, a sixth non-movable end, a seventh non-movable end, and an eighth non-movable end, the fourth movable end is used for connecting to an input port of a target frequency band, the target frequency band is one of frequency bands in a New Radio frequency band other than the second frequency band, the sixth non-movable end is connected to a first power output port, the seventh non-movable end is connected to a second power output port, and the eighth non-movable end is connected to a third power output port.

4. The radio frequency circuit according to claim 1, wherein the second frequency band transceiver unit further comprises a fourth switch, the fourth switch comprises a fifth movable end, a ninth non-movable end, and a tenth non-movable end, the ninth non-movable end is connected to a third end of the first coupler, the tenth non-movable end is used for connecting to a power detection signal input port, and the fifth movable end is used for connecting to a power detection signal output port.

5. The radio frequency circuit according to claim 1, wherein the radio frequency circuit further comprises a third frequency band transceiver unit, the first switch further comprises a thirteenth non-movable end, the thirteenth non-movable end is connected to one end of the third frequency band transceiver unit, and the other end of the third frequency band transceiver unit is used for connecting to the antenna.

6. The radio frequency circuit according to claim 1, wherein the radio frequency circuit further comprises a second amplifier, a sixth switch, a fourth frequency band transceiver unit, a seventh switch, and a second coupler, the sixth switch comprises a seventh movable end and a plurality of fourteenth non-movable ends, the seventh switch comprises a plurality of fifteenth non-movable ends and an eighth movable end and a ninth movable end connected to each other, the fourth frequency band transceiver unit comprises a first duplexer module, one side of the first duplexer module comprises a plurality of first transmission ports and a plurality of second transmission ports, and the other side of the first duplexer module comprises a third transmission port, wherein an input end of the second amplifier is connected to the radio frequency transceiver, an output end of the second amplifier is connected to the seventh movable end, each of the first transmission ports is connected to one fourteenth non-movable end and the plurality of first transmission ports are connected to different fourteenth non-movable ends, each of the second transmission ports is connected to a receive port of a corresponding frequency band, the third transmission port is connected to one fifteenth non-movable end, the other end of the first frequency band transceiver unit is connected to one fifteenth non-movable end, the other end of the second frequency band transceiver unit is connected to one fifteenth non-movable end, the fifteenth non-movable end connected to the other end of the second frequency band transceiver unit and the fifteenth non-movable end connected to the other end of the first frequency band transceiver unit are different from each other and are both different from the fifteenth non-movable end connected to the third transmission port, the eighth movable end and the ninth movable end are each used for connecting to a seventh end of the second coupler, and an eighth end of the second coupler is connected to the antenna.

7. The radio frequency circuit according to claim 1, wherein the first frequency band transceiver unit comprises a B41 frequency band transceiver unit, and the second frequency band transceiver unit comprises an N41 frequency band transceiver unit.

8. An electronic device, comprising the radio frequency circuit according to claim 1.

9. A radio frequency circuit, comprising: a first amplifier, a first switch, a first frequency band transceiver unit, a second frequency band transceiver unit, and an antenna, wherein the first switch comprises a first movable end, a first non-movable end, and a second non-movable end, wherein
    an input end of the first amplifier is connected to a radio frequency transceiver, an output end of the first amplifier is connected to the first movable end, the first non-movable end is connected to one end of the first frequency band transceiver unit, the second non-movable end is connected to one end of the second frequency band transceiver unit, and the other end the first frequency band transceiver unit and the other end of the second frequency band transceiver unit are both connected to the antenna, wherein the first frequency band transceiver unit comprises a fifth switch, a first frequency band receive port, and a first frequency band filter, and the fifth switch comprises a sixth movable end, an eleventh non-movable end, and a twelfth non-movable end; and one end of the first frequency band transceiver unit is the eleventh non-movable end of the fifth switch, the twelfth non-movable end is connected to the first frequency band receive port, the sixth movable end is connected to one end of the first frequency band filter, the other end of the first frequency band filter is used for connecting to the antenna, and the other end of the first frequency band transceiver unit is the other end of the first frequency band filter.

\* \* \* \* \*